May 26, 1970 W. M. SANDERSON 3,514,582
NAVIGATIONAL TIME, DISTANCE AND SPEED COMPUTER
Filed Dec. 30, 1968 2 Sheets-Sheet 2
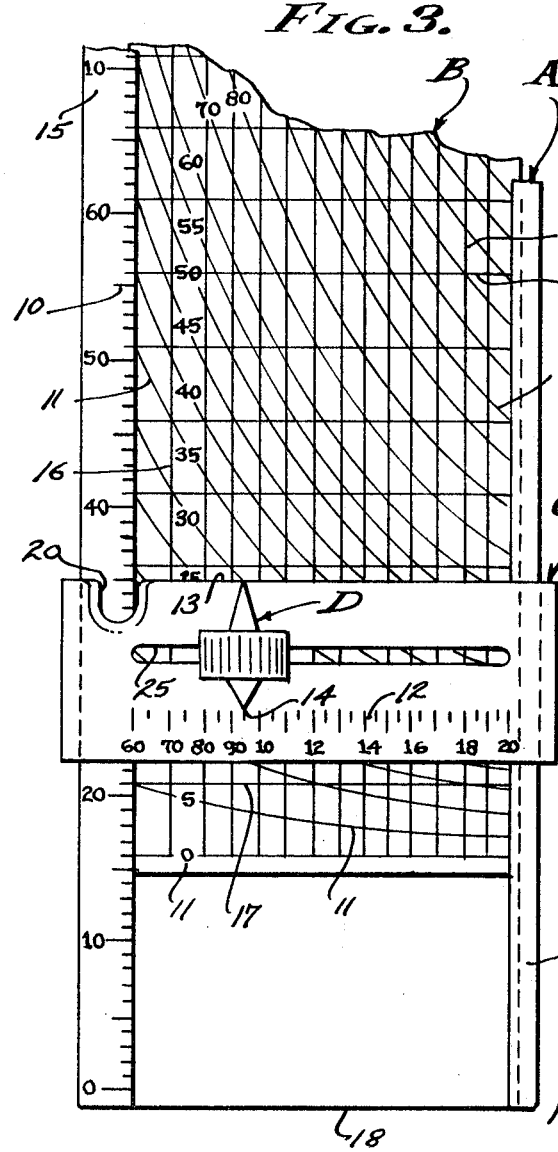
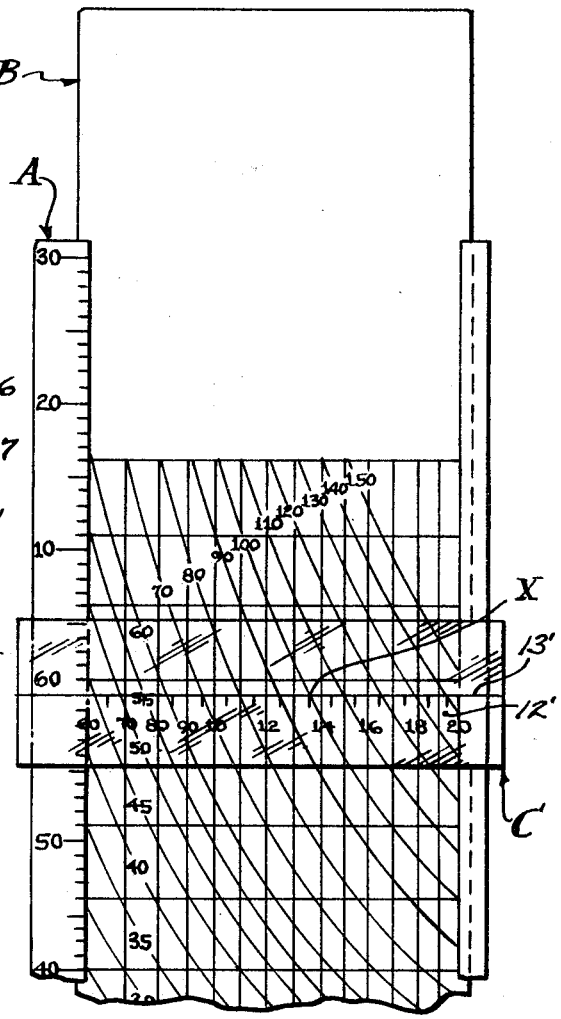
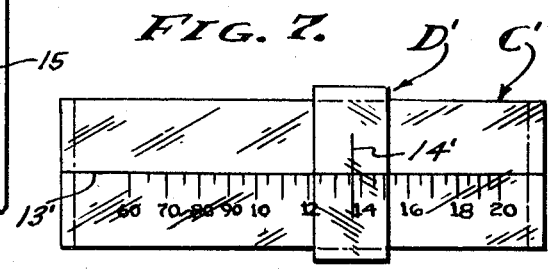
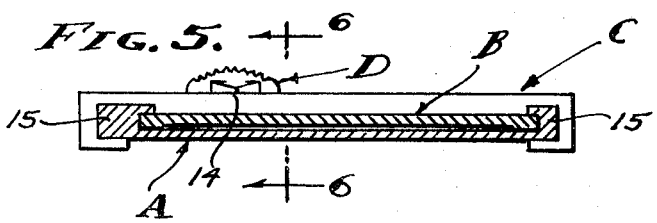
INVENTOR.
WILLIAM M. SANDERSON
BY

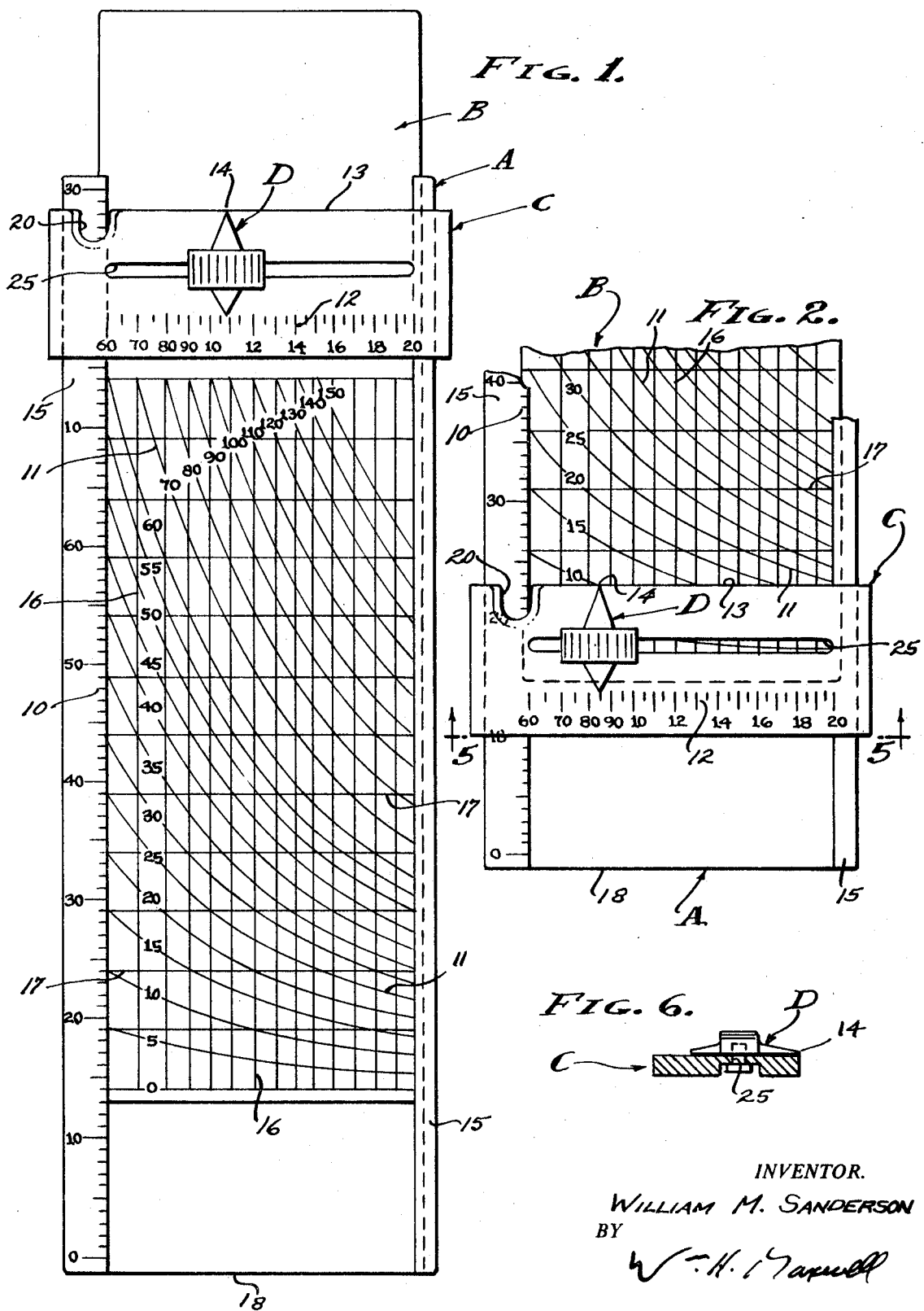

United States Patent Office 3,514,582
Patented May 26, 1970

3,514,582
NAVIGATIONAL TIME, DISTANCE AND
SPEED COMPUTER
William M. Sanderson, Rte. 2, Box 836A, Sierra Road,
San Jose, Calif. 95131
Filed Dec. 30, 1968, Ser. No. 787,659
Int. Cl. G06g 1/16
U.S. Cl. 235—61    20 Claims

ABSTRACT OF THE DISCLOSURE

This invention relates to a navigational computer of the slide rule type wherein calculations are performed through the manipulation of a cursor which relates time factors on a linear scale to distance factors on a graph and through the manipulation of a slider which relates the distance factors on said graph to speed factors on a linear scale. Rapid calculations are obtained with respect to aircraft navigation, to solve climbout problems, to determine estimated times of arrival at any future point, to determine ground speed at any point, to make correction from point to point along a course, and all of which is related to time and speed factor scales that are linear. This computer is an instrument characterized by a cursor movable according to clock time and establishing a line that intersects distance curves showing the locus of time and speed coordinates, and by a slider adjustable to coincide in position on the cursor, with the curves intersected by said line, to indicate speed and namely actual or ground speed. A feature of the instrument is the relative movability of the members bearing the time factors and the distance factors, facilitating corrections without disrupting relationship to actual clock time.

---

The fundamental problem in aircraft navigation is to progress from point to point along a course without getting lost. Also, observation for air traffic is all important and which minimizes the time available for solving navigational problems. Therefore, pilots are trained to establish check points along the course they intend to fly and to estimate times of arrival dependent upon the cruising speed that they intend to fly at. However, air speed is not necessarily ground speed, since wind currents create variations which cannot be accurately predetermined, for example head winds, tail winds and cross winds. For a specific example, a small aircraft flying at an air speed of 120 m.p.h. directly into a head wind of 30 m.p.h. has a ground speed of 90 m.p.h., and there are infinite variations of this problem. Therefore, a diligent pilot with the prior art navigational aids can obtain weather forecasts of winds at certain locations and altitudes and he can laboriously calculate and obtain ground speed and time from departure and from point to point along his course, but which is in most cases inaccurate due to errors in the forecast of winds or due to inadvertent mistakes in calculating. Also, prior art navigational aids require the mental functions of simple mathematics but which are sometimes confusing, and all of which can be negated by unpredictable wind changes which influence the pilot into a realistic frame of mind of considering his precautionary calculation efforts as being fruitless. It is with the foregoing problems in view that the navigational computer of the present invention is provided, in order to circumvent time consuming and laborious mental effort and to replace the same with accurate and fruitful information which keeps the pilot alert and well advised as to his whereabouts, ground speed and estimated time of arrival, and all of which is continuously corrected with relation to clock time and the arrival at check points.

An object of this invention is to provide a manually operable instrument that relates time, distance and speed, all of which are linear factors, so that actual ground speed and estimated times of arrival at any point are determinable at any time during flight. It is to be understood that the pilot has established a course that he will substantially maintain and that he has available to him a speed indicator and time piece. In practice, the aircraft is equipped with an air speed indicator and a clock, both of which are normally adjusted for accuracy at take off or departure.

Another object of this invention is to provide a slide rule type instrument of the character referred to that advantageously employs distance factor lines represented by curves of successive changes in the value of the time coordinates as related to the right angularly related coordinates of speed. With the present invention the cursor of the instrument is manually positioned along the said time coordinates as they are represented by a linear scale hereafter referred to as the clock time scale, the cursor carries a fix line that remains normal to the clock time scale and that intersects both the clock time scale and the distance factor lines, and the cursor carries a linear distance or speed coordinate scale that registers with said first mentioned speed coordinates. A slider is manually positioned along said fix line on the cursor and simultaneously points to the speed coordinate scale to indicate ground speed.

It is another object of this invention to provide a cursor in a slide rule type instrument as hereinabove referred to wherein the slider of the instrument is carried thereby to move manually in a direction normal to the disposition of the primary scale of the instrument to advantageously read against a secondary scale carried by the said cursor.

It is still another object of this invention to provide shiftable body members in a slide rule type instrument as hereinabove referred to wherein the said clock time scale is selectively adjusted to actual time without affecting the distance factor relationship. In practice the distance factor lines are carried on a slide that is movable relative to the primary clock time scale which is fixed on the body of the instrument. This feature lends itself to adjustments in distance traveled as related to actual time which is invariable.

The various objects and features of this invention will be fully understood from the following detailed description of the typical preferred forms and applications thereof, throughout which description reference is made to the accompanying drawings, in which:

FIG. 1 is a front elevational view of a typical embodiment of the computer, showing the distance factor card moved to a starting time of "14" and the cursor moved upward so as to fully expose the graph of distance lines. FIG. 2 is a view showing a utilitarian repositioning of computer parts, firstly of the cursor to an accumulated time of "23" followed by repositioning of the distance factor card to indicate a distance of "10" at the slider which points to "85." FIG. 3 is a view showing another utilitarian repositioning of computer parts, firstly of the cursor to an accumulated time of "35" followed by repositioning of the slider to "30" on the distance factor card so as to indicate a speed of "95." FIG. 4 is a view similar to and shows the top portion of FIG. 3 and illustrates a second form of the invention wherein the cursor is transparent and the slider is eliminated, the fix line intersecting distance line "45" through "140." FIGS. 5 and 6 are sectional views taken as indicated by lines 5—5 on FIG. 2 and 6—6 on FIG. 5 and FIG. 7 illustrates a third form of the invention, combining the features of the first and second forms, wherein both the slider and cursor are transparent for the full view of all indicia.

Although flight plans and logs are a part of the navigational processes involved with the computer herein disclosed, they need not be described for a full understanding of the flight problems. The same is generally true of plotting a course of maps and charts, but a brief word description of charting will be made, as follows: The normal procedure is to draw a course line from a departure point to a destination point and to locate check points therealong at frequent intervals. Because of the geography and ground locations of navigational aids the directional headings vary between different points, and a flight is usually made up of a multiplicity of course lines and each of which is divided by a number of check points. The check points are usually selected for their distinguishability and they are related to distance in order to determine the actual speed of the aircraft. Therefore, a pilot observes the time elapsed in traveling from one point to the next and calculates his actual ground speed each time the aircraft arrives at a check point. In accordance with this invention, the courses are laid out upon charts in the usual manner and preferably divided with check points at 10 mile intervals. The 10 mile intervals are made for simplicity in carrying out the invention, especially in describing the same, it being understood that intervals of any distance can be selected if so desired, in which case interpolation between graph lines is practiced. However, in actual flight practice it has been found to be most practical to arbitrarily select 10 mile intervals between check points. Further, departure points vary, for example depending upon complexity of departure procedures in high density traffic areas, and consequently the selected departure point might well be some distance from takeoff. As a result therefore, the climb-out phase of flight may or may not be involved, but nevertheless is provided for in this computer as will be later described.

Referring now to the instrument per se, this invention provides, generally, a body member A, a distance factor card B, a cursor C and a slider D. The body member A establishes the framework of the instrument and is inscribed with a clock time scale 10 and shiftably carries the distance factor card B and cursor C. The distance factor card B is inscribed with a multiplicity of distance lines 11 and is shiftable to selected positions relative to the clock time scale 10. The cursor C is inscribed with a ground speed scale 12 and carries a fix line 13, both elements 12 and 13 being disposed normal to scale 10, and the slider D is a movable pointer 14 that relates the intersection of line 13 and a distance line 11 with the ground speed scale 12. As shown, the relatively movable elements A through D are manually positioned and remain assembled.

The body member A that establishes the framework and carries the card B and cursor C is a flat elongated member of substantial width, preferably of rectangular plan configuration having a bottom or base end 18. The sides 15 of the member A are parallel, each side forming a guide rail to frictionally receive the card B and cursor C, both of which are carried thereby to be selectively moved longitudinally of the member A. In accordance with the invention, a space of substantial width is exposed between the rails or sides 15, and the clock time scale 10 is inscribed longitudinally along one edge 15, commencing at the base 18 of the instrument. The clock time scale 10 is linear and calibrated in equal increments, each of which represents a minute of time, and in practice calibrated in tens between zero and sixty. As shown, the instrument can be extended as required so as to accommodate a practical time limit of one and one half hours, the instrument shown being designed for small propeller driven aircraft. It is to be understood that the clock time scale and other elements can be augmented in their capacity so as to accommodate any flight duration and/or speeds and distance as may be required.

The distance factor card B that is inscribed with the distance lines 11 is of flat rectangular configuration with spaced and parallel marginal portions captured to slide in the rails or sides 15 of the body member A. The card B can be fixedly positioned on the body member A but is preferably movable in which case the body member presents opposed channels that frictionally receive the card B so that it is manually positionable longitudinally of the member A, the card B and member A being of substantially the same size or planar configuration. In accordance with this invention, the distance factor card B is a graph comprised of a multiplicity of distance lines 11 in the form of curves, each showing the locus of a function of two series of coordinates set at right angles to each other, namely coordinates of time and speed. The time coordinates are in a line coincidental with the effective edge or line of the clock time scale 10 and they extend longitudinally along the left hand side of card B, increasing linearly in minute values from base 18, while the speed coordinates extend transversely thereof, increasing linearly in m.p.h. values from left to right parallel to base 18. In the particular instrument illustrated, speed coordinates from 60 m.p.h. to 200 m.p.h. are selected, and each 10 mile per hour increment in speed is represented by an inscribed line 16 extended longitudinally of the card parallel with the clock time scale 10. Consequently, the speed range capability of the instrument begins at one mile per minute in which case the minute coordinates of the members A and B are equally spaced, and each five minute increment in time is represented by an inscribed line 17 extended transversely of the card and normal to the clock time scale 10.

A multiplicity of distance lines 11, each an individual curve, extend from the time coordinate side of card B and toward the opposite side thereof, and in practice they are spaced at five mile intervals. The foregoing incremental spacing is practical from zero to sixty miles, and beyond which the increment spacing is every ten miles. It will be observed that the locus of all distance lines 11 intersect the lines 16 at the distance traveled for the rate of speed represented by that speed line 16. A typical graph of such lines is shown in the drawings, and for example the ten mile distance line 11 intersects the 60 m.p.h. speed coordinates at ten minutes, it intersects the 120 m.p.h. speed coordinates at five minutes, and it intersects the 200 m.p.h. coordinates at 3.3+ minutes. The zero distance line 11 is necessarily straight and normal to the series of time coordinates at the left hand side of the card B. It is to be observed that the distance lines 11 are inverted curves, showing diminishing time values at the intersection of increased speed value coordinate lines.

The cursor C that is inscribed with the ground speed scale 12 and that carries the fix line 13 can vary in form and is essentially a carriage that spans the space between the sides or rails 15 of the body member A and is captured to slide in the rails or over the sides 15 of the body member. The cursors C is selectively movable and slides over the body member A independent of the card B so that it is manually positionable longitudinally of the member A. In accordance with the invention, the ground speed scale 12 and fix line 13 are parallel and are disposed normal to the clock time scale 10. For example, the top edge of the cursor presents the fix line 13 while the lower margin of the cursor is inscribed with the ground speed scale 12. The cursor is provided with a window 20 (or it can be transparent as shown in FIG. 4) that facilitates reading of the clock time scale 10, so that the fix line 13 can be readily manipulated to any selected time. The ground speed scale 12 is calibrated in linear increments the same as are the speed coordinates inscribed on the card B, and the graduations on the scale 12 coincide with lines 16 having the same value on card B. Therefore, the ground speed calibrations for 60 m.p.h. on scale 12 coincide with, or overlie, the 60 m.p.h. line 16 on card B, and the 200 m.p.h. calibrations on scale 12 coincide with the 200 m.p.h. line 16 on card B, etc. In practice, five mile per hour intermediate calibrations are also inscribed on the scale 12. It is to be observed that the ground speed scale 12 increases linearly from left to right.

The slider D that is movable to relate the intersection of fix line 13 and a distance line 11 with the ground speed scale 12 is essentially a selectively movable pointer adapted to point simultaneously to said intersection and to said scale. More particularly, the slider D is a memory means that retains the estimated and/or actual speed indication. Therefore, it can be a single pointer 14 in which case the ground speed scale is inscribed in the upper margin of the cursor C (not shown) adjacent to the fix line 13. The slider D can be a double pointer 14, as shown in FIGS. 1–3, 5 and 6, captured in a guide 25 to slide transversely, between and parallel to fix line 13 and scale 12. As shown in FIG. 4, the speed indication is directly readable on the transparent cursor adjacent the fix line 13' without the aid of the slider D, however the memory function of the eliminated slider is lacking. In the preferred form as shown in FIG. 7, the slider D' too is transparent, having a single pointer 14' in the form of an inscribed line disposed normal to and so as to intersect the fix line 13'.

In order to establish a thorough and practical understanding of the computer hereinabove described, the following suggests the practical uses therefor. However, the following assumptions are purely hypothetical for illustrative purposes only and are not intended to be practical, i.e. the speeds as may be caused by extreme winds are not intended as realistic transitions: Assuming that the pilot has prepared a flight plan and has laid out a route and courses with check points, he observes, for example, that his take off or departure time was 12:14 p.m., in which case the zero (departure) distance line 11 of the card B is moved to coincide with 14 minutes on the scale 10 (see FIG. 1 showing a card position representing 12:14 p.m.). Therefore, a climb-out procedure is in order, and let us assume that the climb-out air speed is 85 m.p.h., setting pointer 14 of slider D at 85 m.p.h. on scale 12, which would be 7+ minutes for ten miles to the first check point. However, let us assume that said climb-out required 9 minutes (instead of 7+ minutes) in which case the fix line 13 of cursor C is moved to coincide with 14+9 minutes or 23 minutes on the clock time scale 10 (see FIG. 2). The pointer 14 of the slider D is now moved to the intersection of fix line 13 with the curved distance line 11 having the 10 mile value, which would then show a 65 m.p.h. ground speed on scale 12. The climb-out procedure is then terminated by shifting pointer 14 to the estimated cruising speed of 85 m.p.h. and by shifting the card B so that the said ten mile distance line intersects fix line 13 at the repositioned pointer 14 (again see FIG. 2) cursor C remaining unmoved. Assume now that the pilot has leveled off at cruising altitude and progresses toward the next fix point on his course. For example assuming no winds, fix point two at 20 miles at 85 m.p.h. indicated and 7 minutes would be an accumulated clock time of 30 minutes (representing 12:30 p.m.), in which case the pointer 14 of slider D is manipulated to correctly coincide with the intersection of fix line 13 and the curved distance line 11 having the 20 mile value (not shown). For example, assuming an effective tail wind bringing the aircraft to a 30 mile fix point three in 5 minutes, a clock time of 35 minutes (see FIG. 3 showing a card position representing 12:35 p.m.) accumulates and the fix line 13 accordingly moved on scale 10 and the pointer 14 of slider D moved to the right to the intersection of fix line 13 and the curved distance line 11 having the 30 mile value and showing 95 m.p.h. ground speed. Finally, (not shown) for example assuming an effective head wind bringing the aircraft to the 40 mile fix point four in 9 minutes, a clock time of 44 minutes (representing 12:44 p.m.) is accumulated and the fix line 13 accordingly moved on scale 10 and the pointer of slider D moved to the left to the intersection of fix line 13 and the curved distance line 11 having the 40 mile value and showing an 80 m.p.h. ground speed.

Referring now to FIG. 4 and the second form of the computer, assume that a faster aircraft is being piloted at a ground speed of 136 m.p.h. as previously calculated by the computer, and which the pilot in good judgment will rely upon in estimating times of arrival at various check points and/or his 100 mile destination. For example, in FIG. 4 "X" indicates the intersection of fix line 13' with the 100 mile distance line at a time of 60 minutes and at a speed indication of 136 m.p.h. Hypothetically therefore, if the said 136 m.p.h. ground speed were maintained from the departure point, the time of departure would have been 16 minutes after the hour and the estimated time of arrival at 100 miles would then be on the hour 44 minutes later. It will be observed that the pilot can move the cursor C ahead at any time in order to anticipate an estimated time of arrival at any fix point or destination along the course or route that he has planned.

A feature of the present invention is the ever widening spacing of the inscribed lines 16 marking the speed coordinates of the distance factor card B, and of the coincidental spacing of the ground speed scale 12. That is, these lines and scale markings are wider apart between the 60 to 70 m.p.h. range than at the top end range of 190 to 200 m.p.h., and by this means the parallax error is confined mainly to the first ten miles of flight instead of being spread noticeably over about 30 miles if the speed lines and scale were equally spaced. By inscribing the higher speed ranges close together and the lower speed ranges farther apart, the parallax error diminishes rapidly and/or becomes insignificant. Since the pilot is usually busy climbing out of air traffic during the first ten miles, he is not yet concerned about being lost or off course. Therefore, noticeable parallax error of the instrument is confined to the first ten miles where it is of little or no concern. In practice, the spacing of the speed scale calibrations and the lines 16 is in radical sequence increments, as shown, and this spacing has been found to be most advantageous for readability and minimized effect of parallax error due to the angular dispositions of the distance lines 11.

Having described only typical preferred forms and applications of my invention, I do not wish to be limited or restricted to the specific details herein set forth, but wish to reserve to myself any modifications or variations that may appear to those skilled in the art.

Having described my invention, I claim:

1. A computer for relating time, distance and speed, and including; a body member inscribed with a clock time scale extending longitudinally thereof, a distance factor card on the body adjacent to said clock time scale and inscribed with a multiplicity of incrementally spaced distance lines and each representing a specific distance and showing the locus of a function of time and speed coordinates, said time coordinates on the card being extended parallel with the clock time scale and said speed coordinates on the card being extended normal to the clock time scale, and a cursor slideable longitudinally of the body member and carrying a fix line disposed normal to said clock time scale and said time coordinates and adapted to intersect both the clock time scale and a distance line and inscribed with a speed scale extending adjacent and parallel to the fix line and calibrated in rates of speed corresponding in value and position with the speed coordinates on the card, whereby longitudinal positioning of the fix line through selective placement of the cursor relates accumulated time on said clock time scale with rate of speed on said speed scale by observing where said fix line intersects a distance line.

2. The computer as set forth in claim 1 and wherein the distance factor card is shiftable longitudinally of the body member for selective positioning of its time coordinates in relation to the clock time scale, whereby the instrument is adjustable to actual clock time.

3. The computer as set forth in claim 1 and wherein the said distance lines are incrementally spaced and represent successively increased specific distances.

4. The computer as set forth in claim 1 and wherein the said speed coordinates represent exacting rates of speed.

5. The computer as set forth in claim 1 and wherein the said speed coordinates are incrementally spaced and represent successively increased exacting rates of speed.

6. The computer as set forth in claim 1 and wherein the time coordinates of the distance factor card are spaced equally in value to the time calibrations on the clock time scale of the body member.

7. The computer as set forth in claim 1, wherein the distance factor card is shiftable longitudinally of the body member for selective positioning of its time coordinates in relation to the clock time scale whereby the instrument is adjustable to actual clock time, wherein the said distance lines are incrementally spaced and represent successively increased specific distances, and wherein the said speed coordinates are incrementally spaced and represent successively increased exacting rates of speed.

8. The computer as set forth in claim 1, wherein the distance factor card is shiftable longitudinally of the body member for selective positioning of its speed coordinates in relation to the clock time scale whereby the instrument is adjustable to actual clock time, wherein the said distance lines are incrementally spaced and represent successively increased specific distances, and wherein the time coordinates of the distance factor card are spaced equally in value to the time calibrations on the clock time scale of the body member.

9. The computer as set forth in claim 1 and wherein the said cursor includes an opaque carriage overlying the clock time scale on said body and overlying the distance lines on said distance factor card, said fix line being along one edge of the cursor, and there being a window in the carriage exposing the clock and scale at both sides of said fix line.

10. The computer as set forth in claim 1 and wherein the said cursor includes a transparent carriage overlying the clock time scale on said body and overlying the distance lines on said distance factor card, said fix line being inscribed in the carriage of the cursor between the edges thereof and visibly exposed over said clock time scale and over said distance lines.

11. A memory retaining computer for relating time, distance and speed, and including; a body member inscribed with a clock time scale extending longitudinally thereof, a distance factor card on the body adjacent to said clock time scale and inscribed with a multiplicity of incrementally spaced distance lines and each representing a specific distance and showing the locus of a function of time and speed coordinates, said time coordinates on the card being extended parallel with the clock time scale and said speed coordinates on the card being extended normal to the clock time scale, a cursor slideable longitudinally of the body member and carrying a fix line disposed normal to said clock time scale and said time coordinates and adapted to intersect both the clock time scale and a distance line and inscribed with a speed scale extending adjacent and parallel to the fix line and calibrated in rates of speed corresponding in value and position with the speed coordinates on the card, and a slider having a pointer selectively positionable along said fix line and said speed scale, whereby longitudinal positioning of the fix line through selective placement of the cursor relates accumulated time on said clock time scale with rate of speed on said speed scale as indicated and retained by positioning of said pointer where said fix line intersects a distance line.

12. The computer as set forth in claim 11 and wherein the distance factor card is shiftable longitudinally of the body member for selective positioning of its time coordinates in relation to the clock time scale, whereby the instrument is adjustable to actual clock time.

13. The computer as set forth in claim 11 and wherein the said distance lines are incrementally spaced and represent successively increased specific distances.

14. The computer as set forth in claim 11 and wherein the said speed coordinates represent exacting rates of speed.

15. The computer as set forth in claim 11 and wherein the said speed coordinates are incrementally spaced and represent successively increased exacting rates of speed.

16. The computer as set forth in claim 11 and wherein the time coordinates of the distance factor card are spaced equally in value to the time calibrations on the clock time scale of the body member.

17. The computer as set forth in claim 11, wherein the distance factor card is shiftable longitudinally of the body member for selective positioning of its time coordinates in relation to the clock time scale whereby the instrument is adjustable to actual clock time, wherein the said distance lines are incrementally spaced and represent successively increased specific distances, and wherein the said speed coordinates are incrementally spaced and represent successively increased exacting rates of speed.

18. The computer as set forth in claim 11, wherein the distance factor card is shiftable longitudinally of the body member for selective positioning of its time coordinates in relation to the clock time scale whereby the instrument is adjustable to actual clock time, wherein the said distance lines are incrementally spaced and represent successively increased specific distances, and wherein the time coordinates of the distance factor card are spaced equally in value to the time calibrations on the clock time scale of the body member.

19. The computer as set forth in claim 11, wherein the said cursor includes an opaque carriage overlying the clock time scale on said body and overlying the distance lines on said distance factor card, said fix line being along one edge of the cursor and there being a window in the carriage exposing the clock time scale at both sides of said fix line, and wherein the said slider has an opaque pointer positionable adjacent and along both the fix line and the speed scale on said cursor.

20. The computer as set forth in claim 11, wherein the said cursor includes a transparent carriage overlying the clock time scale on said body and overlying the distance lines on said distance factor card, said fix line being inscribed in the carriage of the cursor between the edges thereof and visibly exposed over said clock time scale and over said distance lines, and wherein the said slider is transparent and overlies the fix line and speed scale on the cursor and has a line inscribed therein normal to said fix line and speed scale and visibly exposed thereover.

References Cited
UNITED STATES PATENTS

| | | | |
|---|---|---|---|
| 2,487,590 | 11/1949 | Rehill | 235—89 |
| 3,127,102 | 3/1964 | Fallis | 235—61 |
| 3,220,643 | 11/1965 | Gorman | 235—61 |

STEPHEN J. TOMSKY, Primary Examiner

U.S. Cl. X.R.

235—89; 33—1